US009869789B2

(12) United States Patent
Cotton et al.

(10) Patent No.: US 9,869,789 B2
(45) Date of Patent: Jan. 16, 2018

(54) METHODS AND SYSTEMS FOR MONITORING A SUBSURFACE FORMATION WITH A LAND ACTIVE STREAMER

(71) Applicant: CGG SERVICES SA, Massy (FR)

(72) Inventors: Julien Cotton, Paris (FR); François-Xavier Grésillon, Rully (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 15/120,205

(22) PCT Filed: Feb. 23, 2015

(86) PCT No.: PCT/IB2015/000491
§ 371 (c)(1),
(2) Date: Aug. 19, 2016

(87) PCT Pub. No.: WO2015/125019
PCT Pub. Date: Aug. 27, 2015

(65) Prior Publication Data
US 2017/0075016 A1    Mar. 16, 2017

Related U.S. Application Data

(60) Provisional application No. 61/943,890, filed on Feb. 24, 2014.

(51) Int. Cl.
*G01V 1/02* (2006.01)
*G01V 1/44* (2006.01)
*G01V 1/52* (2006.01)

(52) U.S. Cl.
CPC ............... *G01V 1/52* (2013.01); *G01V 1/159* (2013.01)

(58) Field of Classification Search
CPC .................................. G01V 1/52; G01V 1/159
USPC ........................................................ 367/35, 25
See application file for complete search history.

(56) References Cited

U.S. PATENT DOCUMENTS

| 5,179,541 A | 1/1993 | Weido |
| 5,798,488 A | 4/1998 | Beresford et al. |
| 6,552,961 B1 | 4/2003 | Bremner et al. |
| 2005/0150713 A1 | 7/2005 | Garcia-Osuna et al. |

(Continued)

FOREIGN PATENT DOCUMENTS

| EP | 0780701 A1 | 6/1997 |
| WO | 9815850 A1 | 4/1998 |
| WO | 2013076572 A2 | 5/2013 |

OTHER PUBLICATIONS

Bekin; "Geologic surface reconstruction using implicit potential functions with minimal bending energy," CGG Jason, Oct. 21, 2013.

(Continued)

*Primary Examiner* — Daniel L Murphy
(74) *Attorney, Agent, or Firm* — Patent Portfolio Builders PLLC

(57) ABSTRACT

The present disclosure includes a method for monitoring a subsurface formation including disposing an antenna in a horizontal wellbore, the antenna including a plurality of piezoelectric modules. A voltage signal is applied to at least one of the piezoelectric modules to cause the at least one piezoelectric modules to emit seismic energy into the subsurface formation. A resulting signal is received at a receiver. A property of the subsurface formation is determined based, at least in part, on the resulting signal.

17 Claims, 5 Drawing Sheets

(56) References Cited

U.S. PATENT DOCUMENTS

2011/0315471 A1  12/2011  Daley et al.
2012/0069706 A1   3/2012  Goujon et al.
2013/0044565 A1   2/2013  Barr et al.

OTHER PUBLICATIONS

Halliday et al., "On the Use of a Seismic Sensor as a Seismic Source," 75th EAGE Conference & Exhibition incorporating SPE EUROPEC 2013, Jun. 10-13, 2013, London, UK.
International Search Report and Written Opinion dated Sep. 18, 2015 in related International Application No. PCT/IB2015/000491.
Ham, "Design and Experimentation of a Wireless Sensor Network Node Powered by Vibration Energy," School of Engineering and Computer Science, Victoria University of Wellington, May 1, 2012.

METHODS AND SYSTEMS FOR MONITORING A SUBSURFACE FORMATION WITH A LAND ACTIVE STREAMER

CROSS-REFERENCE TO RELATED APPLICATION

The present application claims the benefit of priority under 35 U.S.C. §119 from U.S. Provisional Patent Application Ser. No. 61/943,890, filed on Feb. 24, 2014, which is incorporated by reference in its entirety for all purposes.

TECHNICAL FIELD OF THE DISCLOSURE

This disclosure relates generally to monitoring subsurface formations, and in particular, to methods and systems of piezoelectric modules disposed in horizontal wells for monitoring subsurface formations.

BACKGROUND

Land-based seismic data acquisition and processing techniques are used to generate an image of a geological structure in a subsurface formation. FIG. 1 shows a conventional system for monitoring characteristics of a subsurface formation 105. Conventional systems and methods for monitoring characteristics of a subsurface formation 105 typically include drilling multiple vertical wells 110. Seismic sources 115 are placed into one or more of the vertical wells 110 and seismic receivers 120 are placed into one or more of the vertical wells 110. Wells 110 that contain seismic sources 115 may be referred to as source wells. Wells 110 that contain seismic receivers 120 may be referred to as monitoring wells. Typically, seismic sources 115 and seismic receivers 120 are installed near the surface to reduce installation costs.

Conventional monitoring systems including a network of buried sensors in vertical wells 110 have been used to monitor steam injection in shallow reservoirs, typically between 200 to 1000 meters. Conventional monitoring systems have proven less useful for deeper reservoirs. For example, a deeper reservoir may be located at a depth of around 2,000 meters. Conventional monitoring systems may be hampered by hard formations, which mitigate the seismic response. Likewise, conventional systems that are near surface are less efficient for complex geology. For example, very hard lithographic layers (e.g., anhydrite-type lithography) or inhomogeneous layers diffract seismic energy before it can reach a reservoir being monitored.

Another limitation of conventional monitoring systems is the cost and environmental impact of drilling multiple vertical wells 110. For example, the installation of equipment (such as seismic sources 115 and seismic receiver 120) in tens, hundreds, or more vertical wells 110 can generate permitting issues or, such installation may be forbidden in environmentally fragile areas or in urban areas. What is needed therefore are methods and systems for locating seismic sources and seismic receivers closer to the reservoir and/or decreasing the numbers of holes. What is further needed is a high density of these seismic sources and seismic receivers near the area of interest.

SUMMARY

In one embodiment, the present disclosure may include a method for monitoring a subsurface formation including disposing an antenna in a horizontal wellbore. The antenna includes a plurality of piezoelectric modules. The method further includes applying a voltage signal to at least one of the piezoelectric modules to cause the at least one piezoelectric modules to emit seismic energy into the subsurface formation. The method further includes receiving a resulting signal at one or more seismic receivers. The method further includes determining a property of the subsurface formation based, at least in part, on the resulting signal.

In another embodiment, the present disclosure may include a system for monitoring a subsurface formation. The system includes an antenna configured to be disposed in a horizontal wellbore, the antenna including a plurality of piezoelectric modules. At least one of the piezoelectric modules is selectively configurable as a seismic source and one or more of the piezoelectric modules are selectively configurable as seismic receivers.

In another embodiment, the present disclosure may include a system for monitoring a subsurface formation. The system includes an antenna in a horizontal wellbore, the antenna including a plurality of piezoelectric modules. The system includes at least one processor and a memory including non-transitory computer-readable executable instructions. The executable instructions cause the at least one processor to cause at least one of the piezoelectric modules to selective emit seismic energy into the subsurface formation. The executable instructions cause the at least one processor to receive a resulting signal at one or more seismic receivers. The executable instructions cause the at least one processor to determine a property of the subsurface formation based, at least in part, on the resulting signal.

BRIEF DESCRIPTION OF THE DRAWINGS

For a more complete understanding of the present disclosure and its features, reference is now made to the following description, taken in conjunction with the accompanying drawings, in which like reference numbers indicate like features and wherein.

DETAILED DESCRIPTION

Figure 1:
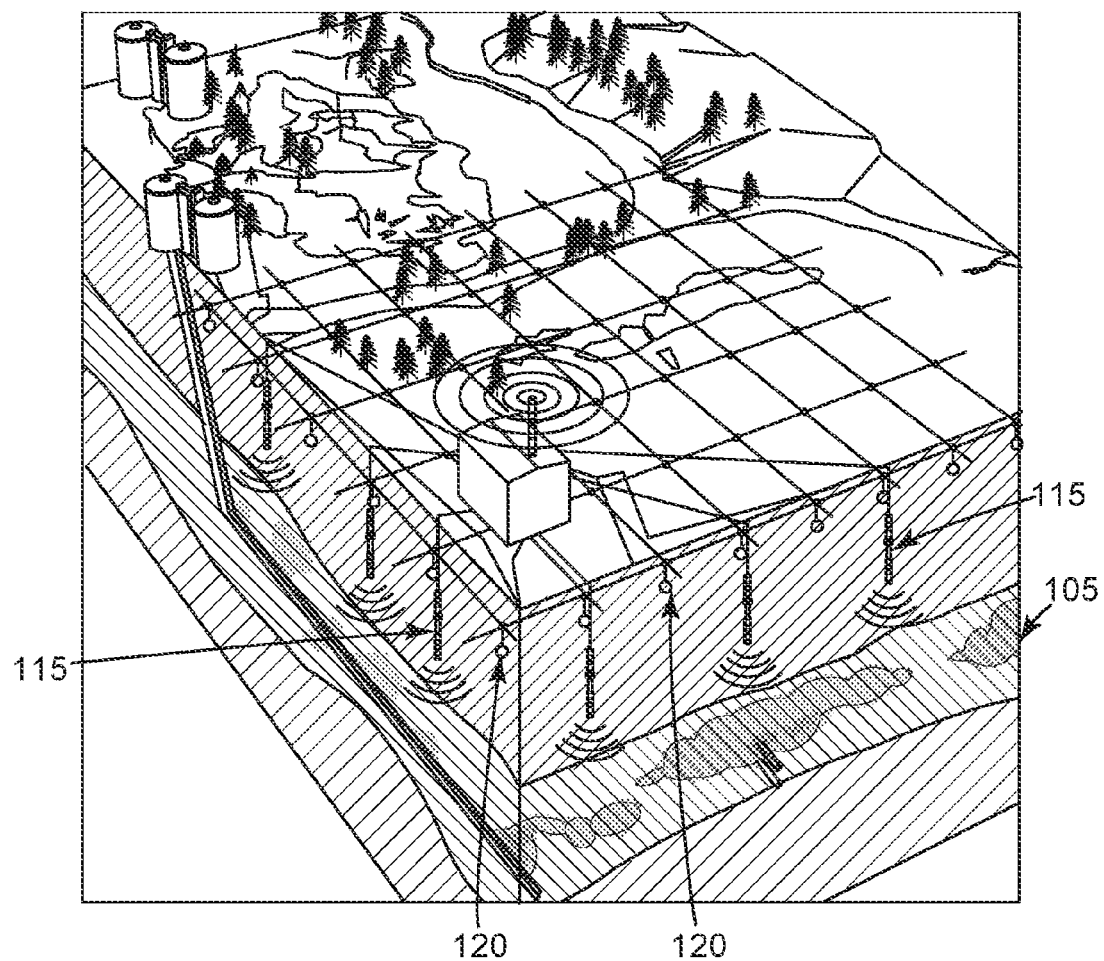
FIG. 1 illustrates an example land-based system for monitoring a subsurface formation.
Figure 2:
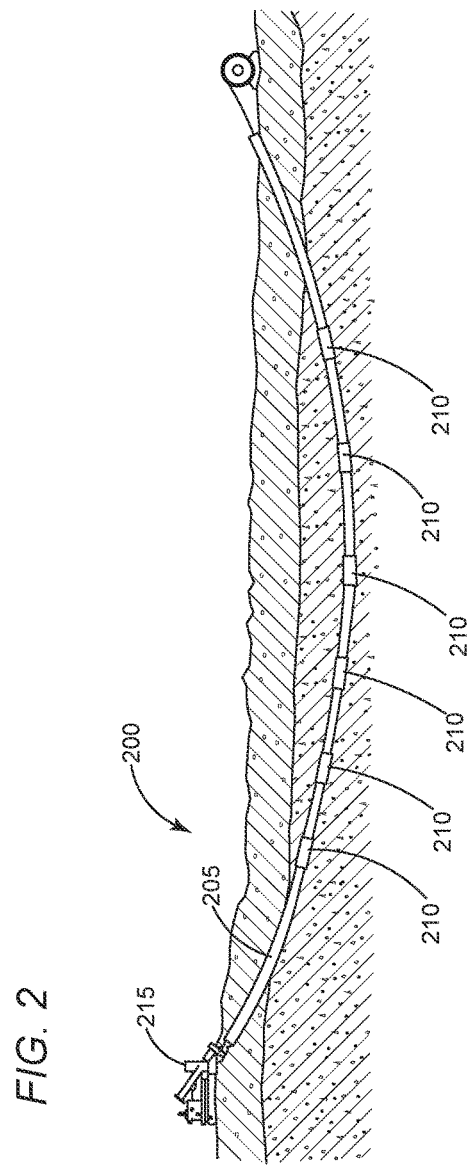
FIG. 2 illustrates an example land-based system with equipment installed in horizontal boreholes for monitoring a subsurface formation.

FIG. 2 shows an example land-based system for monitoring a subsurface formation according to the present disclosure. An antenna according to the present disclosure is shown generally at 200. Although described herein as land-based, the systems and methods of the present disclosure are equally applicable to use at the floor of a body of water. The antenna 200 is disposed in a horizontal wellbore. The wellbore may be located above or near a subsurface formation of interest. In one example embodiment, the antenna 200 is disposed in a horizontal wellbore above one or more portions of a reservoir for monitoring. In some example embodiments, the horizontal wellbore is drilled to a depth that is deeper than typical vertical wells. In other example embodiments, the horizontal wellbore is drilled to a depth that is shallower than a typical vertical well. In some example embodiments, the horizontal well is placed close to the subsurface that is being monitored. The example antenna 200 includes cabling 205 to draw the antenna into the horizontal wellbore. In some example embodiments, the cable 205 includes a cable that is used to place the antenna into the borehole. In certain example embodiments, the cable 205 includes a steel cable. In other example embodiments, the cable 205 includes a chain. In certain example embodiments, the cable 205 includes a cable or rope made from a material that has a high tensile strength. Example materials include steel, Kevlar, or aramid fibers. In some example implementations, cabling 205 includes at least one high-voltage lines to pilot the piezoelectric modules. The example antenna 200 may further include low voltage cables to operate switches for the piezoelectric modules 210. The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of sensors including a plurality of piezoelectric modules that are disposed in a horizontal well. The embodiments, however, are not limited to these configurations, and may be extended to other arrangements.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As used herein, a horizontal wellbore is not limited to a wellbore that runs parallel to the surface of the earth. Instead, a horizontal wellbore is one that includes a segment that deviates from vertical. Example horizontal wellbores according to the present disclosure include two or more segments with different deviations from vertical. Example horizontal wellbores according to the present disclosure include a vertical segment that is connected to a deviated segment of wellbore.

The antenna 200 may comprise a plurality of piezoelectric modules 210. In certain example embodiments, one or more piezoelectric modules 210 are configured as acoustic sensors. In certain example embodiments, one or more piezoelectric modules 210 are configured as acoustic sources. In one example embodiment, a single piezoelectric module 210 is configured as an acoustic source and the remaining piezoelectric modules 210 are configured as acoustic sensors. In one example embodiment, two piezoelectric modules 210 are configured as an acoustic source and the remaining piezoelectric modules 210 are configured as acoustic sensors. In one example embodiment, all of the piezoelectric modules 210 are configured as acoustic sources. In one example embodiment, all of the piezoelectric modules 210 are configured as acoustic receivers. In certain example embodiments, one or more piezoelectric modules 210 are used as seismic sources in a system with one or more conventional seismic receivers, such as geophones, hydrophones, or accelerometers. In certain example embodiments one or more the piezoelectric modules 210 further include switches to change the module of the piezoelectric modules 210 between active (e.g., mode where the piezoelectric module 210 acts as a source) to passive (e.g., mode where the piezoelectric module 210 acts as a receiver). In certain example embodiments, the piezoelectric modules 210 are selectively reconfigurable to act as a source or a receiver. In certain example embodiments, the piezoelectric modules 210 have a solid structure and are not fluid-filled. An antenna 200 with solid piezoelectric modules 210 may be used in a borehole that is not fluid-filled.

In some example embodiments, the antenna 200 is connected with a control system 215. In some example embodiments, the control system 215 controls the operation of antenna 200. In some example embodiments, the control system 215 receives data from the antenna 200 to monitor the subsurface formation.

Figure 3:
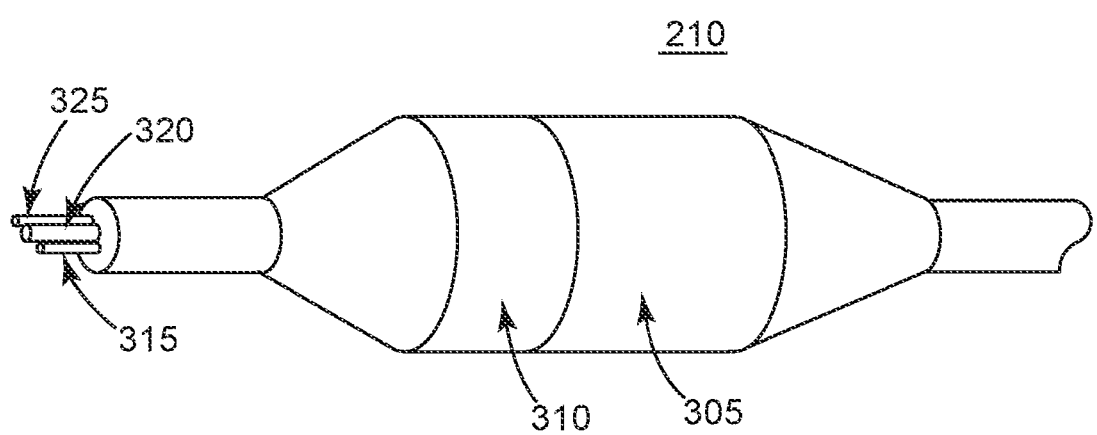
FIG. 3 illustrates an example piezoelectric module.

FIG. 3 shows an example piezoelectric module 210. The piezoelectric module 210 includes a ceramic piezoelectric module 305. The module 305 shown in FIG. 3 is shown as a cylinder. Other example embodiments include a spherical or nearly-spherical piezoelectric module 305. Other example piezoelectric modules 305 include a pillar, which may be formed by a stack of ceramic rings. In certain example embodiments, other piezoelectric modules 305 are a pillar with plates on either end that may be connected to each other. The piezoelectric modules 305 may include piezoelectric materials configured as segmented rings, as a striped cylinder, as a slotted cylinder, or as a bender-type of piezoelectric element.

Certain example piezoelectric modules 305 are configured to produce a seismic signal when voltage signal is applied to the piezoelectric module 305. Other example piezoelectric modules 305 are configured to produce an electric signal in response to the presence of an acoustic wave. In certain example embodiments, one or more others piezoelectric modules 305 are configured to receive acoustic waves. In certain example embodiments, one or more others piezoelectric modules 305 are configured to transmit acoustic waves.

In certain example implementations, the size and shape of the ceramic piezoelectric module 305 are based on the dimensions of the wellbore where the antenna 200 will be placed. In some example implementations, the geometry of the ceramic piezoelectric module 305 is optimized for the borehole. In some implementations, the size of the piezoelectric modules 305 is based on a desired sensitivity of a receiver or desired power of a source. In general, larger piezoelectric modules 305 are more sensitive than smaller piezoelectric modules 305.

In certain example embodiments, the system may include one or more seismic receivers other than piezoelectric modules 305 that are configured as seismic receiver. Example systems include one or more hydrophones, geophones, accelerometers, or other seismic receivers. Seismic receivers may be located on, buried beneath, or proximate to surface of the earth within an exploration area. In general, seismic receivers may be any type of instrument that is operable to transform seismic energy or vibrations into a signal compatible with the data acquisition system, for example a voltage signal, a current signal, or an optical signal. For example, seismic receivers may be a vertical, horizontal, or multicomponent geophone, accelerometers, or optical fiber or distributed acoustic sensor (DAS) with wire or wireless data transmission, such as a three component (3C) geophone, a 3C accelerometer, hydrophone, or a 3C Digital Sensor Unit (DSU). Multiple seismic receivers may be utilized within an exploration or monitoring area to provide data related to multiple locations and distances from seismic sources. In certain example embodiments, the seismic receivers include one or more disturbed acoustic sensors. In other example embodiments, the seismic receivers include one or more optical fiber sensors. Seismic receivers may be positioned in multiple configurations, such as linear, grid, array, or any other suitable configuration. In some embodiments, seismic receivers are positioned along one or more strings.

Example piezoelectric modules 210 may further include an electronics module 310. Example electronics modules 310 include a digitizer to convert an analog signal form the piezoelectric module 305 to a digital signal for transmission to the control system 215. Example electronics modules 310 include one or more processors and memory for performing one or more signal processing operations or storing measurements. Example electronics modules 310 include a transmitter or other networking capability to communicate with the control system 215 at the surface or with one or more other piezoelectric modules 210. Example electronics modules 310 include a switching element to selectively configure the piezoelectric module 305 either as a source or as a sensor. Example switching elements are controlled by, for example, the control system 215. Other example switching elements are automated according to a programmed pattern. In some example embodiments, the mode of the piezoelectric modules 210 may be switched before the piezoelectric modules 210 are disposed in the borehole. In other example embodiments, the mode of the piezoelectric modules 210 may be switched after piezoelectric modules 210 are disposed in the borehole.

The piezoelectric modules 210 are connected with one or more high voltage cables 315 for controlling the operation of active piezoelectric modules 210. In certain embodiments, the high voltage cables 315 allows for control of active piezoelectric modules 210 at the surface, for example, by a control system 215. The piezoelectric modules 210 are connected with a communications cable 320 for transmitting and receiving data. Example communications cables are copper or optical fiber. The piezoelectric modules 210 are attached to a cable 325 to permit recovery of the antenna 200. One example cable 325 is a steel cable.

In certain example embodiments, two or more piezoelectric modules 210 are configured as sources to perform multi-source acquisition. In certain example embodiments, one piezoelectric module 210 is configured as a source to perform single-source acquisition. In certain example implementations, for piezoelectric modules 210 that are configured as sources, a series of signals are applied to the piezoelectric modules 210 to cause the piezoelectric modules 210 to output multi-source emissions. Example multi-source emissions may include one or more monofrequency emissions or one or more frequency sweeps. In some example implementations, the frequency sweep is controlled by the control system 215. The output from the control system 215 is amplified by an amplifier before being output by the piezoelectric modules 210 that have been configured as sources. In other example implementations, the frequency sweep is controlled by one or more electronics modules. In some example embodiments, two or more of the piezoelectric modules 210 are operated as sources to filter or focus a resulting signal.

In addition to antenna 200, some example implementations also use one or more geophones located on the Earth or in subsurface formations as part of the monitoring of the subsurface formation. Signals from the geophones may be sent to the control system 215. In addition to antenna 210, some example implementations also use one or more accelerometers located on the Earth or in subsurface formations as part of the monitoring of the subsurface formation. Signals from the accelerometers may be sent to the control system 215. Some example implementations also use one or more hydrophones located on the Earth or in subsurface formations as part of the monitoring of the subsurface formation. Signals from the hydrophones may be sent to the control system 215.

One or more seismic receivers, such as one or more piezoelectric modules 305 that are configured as receivers, transmit seismic data from reflected seismic energy via a network to control system 215. In certain embodiments, the transmission from the seismic receivers to the control system 215 is by a network. The control system 215 may perform seismic data processing on the seismic data to prepare the data for interpretation. For example, control system 215 may perform the data processing techniques described in FIG. 5. Control system 215 may include any equipment or combination of equipment operable to compute, classify, process, transmit, receive, store, display, record, or utilize any form of information, intelligence, or data. Control system 215 may include one or more personal computers, storage devices, servers, or any other suitable device and may vary in size, shape, performance, functionality, and price. Example embodiments of control system 215 include random access memory (RAM), one or more processing resources, such as a central processing unit (CPU) or hardware or software control logic, or other types of volatile or non-volatile memory. Additional components of control system 215 include one or more disk drives, one or more network ports for communicating with external devices, and one or more input/output (I/O) devices, such as a keyboard, a mouse, or a video display. Control system 215 may be located in a station truck or any other suitable enclosure.

Example control systems 215 may include one or more amplifiers to provide a signal to seismic sources, such as one or more piezoelectric modules 210 that are configured to be seismic sources. Example control systems 215 may include one or more digitizers to convert signals from seismic receivers to corresponding values for further analysis by the control systems 215.

Figure 4:
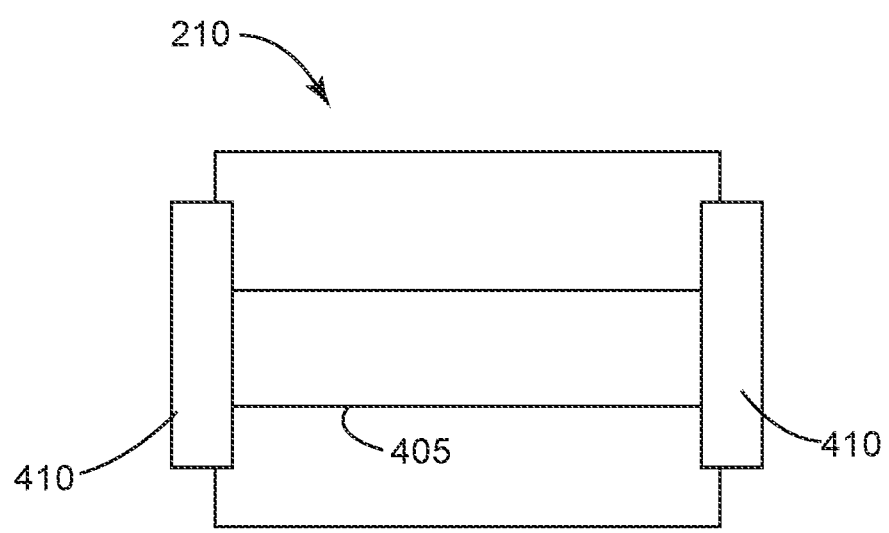
FIG. 4 is an example piezoelectric module in accordance with some embodiments of the present disclosure.

As shown in FIG. 4, an example piezoelectric module 210 includes a pillar source 405, which may be formed by the stacking of ceramic rings and plates 410 on either end of the pillar source. In some example implementations, the plates 410 are connected.

Figure 5:
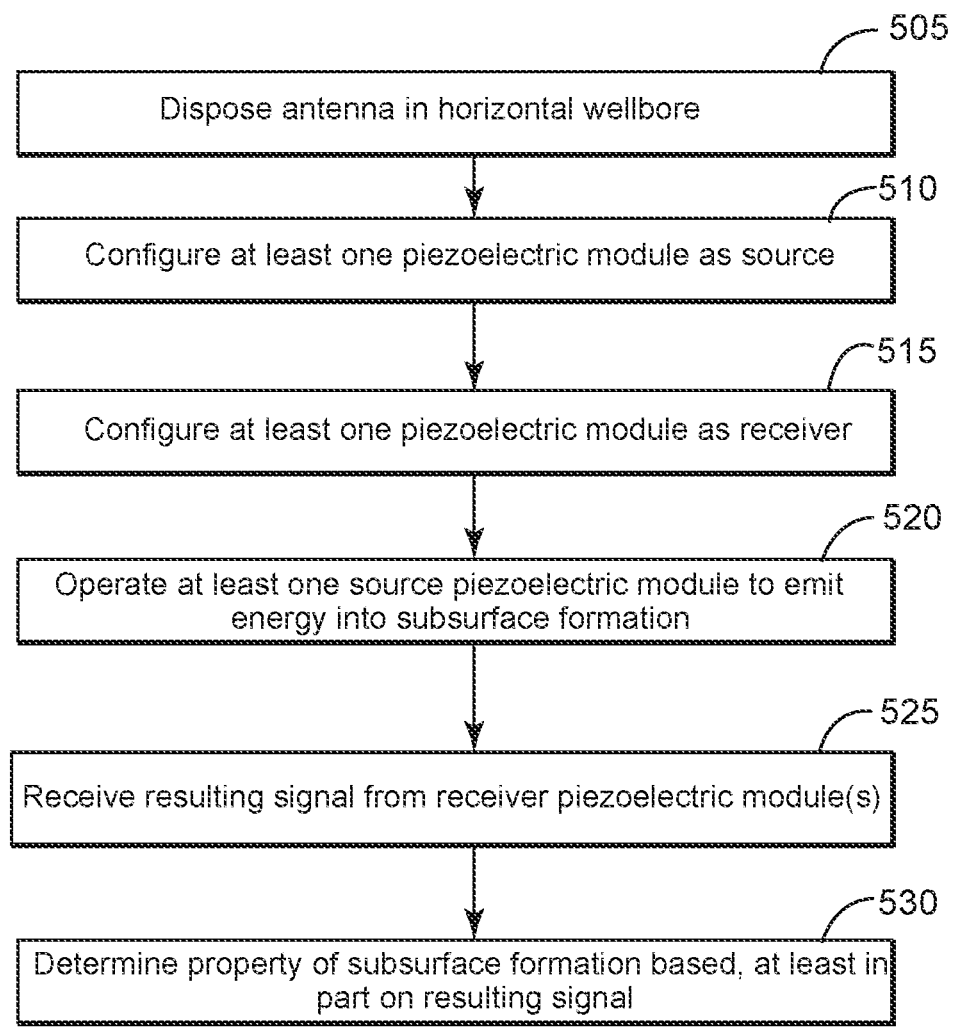
FIG. 5 is a flow chart of an example method of monitoring a subsurface formation, in accordance with some embodiments of the present disclosure.

FIG. 5 is a flow chart of an example method of the present disclosure. Example embodiments may omit one or more of blocks 505-530. Other example embodiments include additional steps. Other example embodiments perform one or more of block 505-304 in an alternative order. In block 505, the antenna 200 is disposed in a horizontal wellbore. In some example embodiments, the wellbore is drilled in the Earth along a path for monitoring of a subsurface formation of interest. In block 510, at least one of the piezoelectric modules 210 is configured as a seismic source. In some example embodiments, this configuration is done at the surface before the antenna 200 is disposed in the wellbore. In other example embodiments, the configuration is performed by the control system 215 sending a signal to electronics modules 310 in one or more piezoelectric modules 210 to selectively configure the piezoelectric module 210 as a source.

In block 515, at least one of the piezoelectric modules 210 is configured as a receiver. In some example embodiments, this configuration is done at the surface before the antenna 200 is disposed in the wellbore. In other example embodiments, the configuration is performed by the control system 215 sending a signal to electronics modules 310 in one or more piezoelectric modules 210 to selectively configure the piezoelectric module 210 as a receiver.

In block 520, a high voltage signal is applied to piezoelectric modules 210 that are configured as sources causing acoustic energy to be emitted into the subsurface formation. In block 525, the resulting signal is received at piezoelectric modules 210 that are configured as receivers. In other example embodiments, the resulting signal is received by one or more geophones, hydrophones, or other receivers. In block 430, the control system 215 determines at least one property of the subsurface formation based, at least in part, on the received resulting signal. For example, the control system 215 may determine the depletion of a reservoir. In other embodiments, the control system 215 determines the progression of a work-over operation. In other embodiments, the control system 215 monitors steam injection into a subsurface formation.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

The invention claimed is:

1. A method for monitoring a subsurface formation comprising:
   disposing an antenna in a horizontal wellbore, the antenna including a plurality of piezoelectric modules distributed along a cable, wherein the antenna extends from an entry point of the horizontal wellbore to an exit point of the horizontal wellbore, where both the entry and the exit points are at a surface of the earth;
   applying a voltage signal to first and second of the piezoelectric modules to cause the first and second piezoelectric modules to emit seismic energy into the subsurface formation, wherein the first and second piezoelectric modules act as seismic sources;
   receiving a resulting signal at third and fourth of the piezoelectric modules, wherein the third and fourth piezoelectric modules act as seismic receivers; and
   determining a property of the subsurface formation based, at least in part, on the resulting signal.

2. The method of claim 1, wherein the third and fourth piezoelectric modules are selectively configured as seismic receivers.

3. The method of claim 1, further comprising:
   receiving the resulting signal at one or more geophones, one or more accelerometers, or one or more hydrophones.

4. The method of claim 1, wherein the third and fourth of the piezoelectric modules are solid.

5. The method of claim 1, wherein the third and fourth piezoelectric modules include a piezoelectric ceramic pillar.

6. The method of claim 1, wherein the third and fourth piezoelectric modules further include a digitizer to convert a received resulting signal to a digital signal for transmission to a computer system.

7. The method of claim 1, wherein the third and fourth piezoelectric modules further include a switching module to selectively configure the piezoelectric modules as a seismic source or as a seismic receiver.

8. The method of claim 1, wherein the piezoelectric modules are configured as seismic sources.

9. The method of claim 1, wherein each of the plurality of piezoelectric modules includes a switch for selective configuring the piezoelectric module as a seismic source or a seismic receiver.

10. A system for monitoring a subsurface formation comprising:
    an antenna configured to be disposed in a horizontal wellbore, the antenna including a plurality of piezoelectric modules distributed along a cable, wherein the antenna extends from an entry point of the horizontal wellbore to an exit point of the horizontal wellbore, where both the entry and the exit points are at a surface of the earth;
    wherein first and second of the piezoelectric modules are selectively configurable as seismic sources that emit seismic energy and third and fourth of the piezoelectric modules are selectively configurable as seismic receivers that receive a resulting signal.

11. The system of claim 10, wherein the third and fourth piezoelectric modules further comprise a digitizer to convert the received resulting signal to a digital signal for transmission to a computer system.

12. The system of claim 10, further comprising:
an amplifier to amplify a signal from a control system to at least one of the piezoelectric modules.

13. The system of claim 10, further comprising:
a control system, comprising a memory and at least one processor, the memory including non-transitory executable instruction that, when executed, cause the least one processor to determine a property of the subsurface formation based, at least in part, on the resulting signal.

14. A system for monitoring a subsurface formation, the system comprising:
an antenna in a horizontal wellbore, the antenna including a plurality of piezoelectric modules distributed along a cable, wherein the antenna extends from an entry point of the horizontal wellbore to an exit point of the horizontal wellbore, where both the entry and the exit points are at a surface of the earth;
at least one processor; and
a memory including non-transitory computer-readable executable instructions, wherein the executable instructions cause the at least one processor to:
cause first and second of the piezoelectric modules to selectively emit seismic energy into the subsurface formation, wherein the first and second piezoelectric modules act as seismic sources;
receive a resulting signal from third and fourth piezoelectric modules, wherein the third and fourth piezoelectric modules act as seismic receivers; and
determine a property of the subsurface formation based, at least in part, on the resulting signal.

15. The system of claim 14, wherein the executable instructions further cause the at least one processor to:
cause the third and fourth piezoelectric modules to selectively receive the resulting seismic signal.

16. The system of claim 14, wherein the seismic receivers include one or more hydrophones, one or more geophones, or one or more accelerometers.

17. The system of claim 14, wherein one or more of the piezoelectric modules are solid.

* * * * *